United States Patent [19]

Otake et al.

[11] Patent Number: 4,540,418
[45] Date of Patent: Sep. 10, 1985

[54] REACTIVE DYE COMPOSITION

[75] Inventors: Katsumasa Otake, Nara; Takashi Omura, Ashiya; Yutaka Kayane, Ibaraki; Kunihiko Imada, Sakai, all of Japan

[73] Assignee: Sumitomo Chemical Company, Limited, Osaka, Japan

[21] Appl. No.: 600,450

[22] Filed: Apr. 16, 1984

[30] Foreign Application Priority Data

Apr. 18, 1983 [JP] Japan ................................. 58-68793

[51] Int. Cl.³ .......................... C09B 67/24; D06P 3/66
[52] U.S. Cl. ............................................ 8/524; 8/527; 8/549; 8/589; 8/918
[58] Field of Search ..................... 8/524, 527, 549, 589

[56] References Cited

U.S. PATENT DOCUMENTS

| | | | |
|---|---|---|---|
| 4,264,323 | 4/1981 | Capponi et al. | 8/527 |
| 4,283,195 | 8/1981 | Nakatsuka et al. | 8/524 |
| 4,349,349 | 9/1982 | Nakatsuka et al. | 8/527 |
| 4,378,313 | 3/1983 | Kayane et al. | 260/153 |
| 4,384,868 | 5/1983 | Sunami et al. | 8/524 |
| 4,415,333 | 11/1983 | Schlafer et al. | 8/524 |

FOREIGN PATENT DOCUMENTS 35171 9/1981 European Pat. Off.
1007752 10/1965 United Kingdom.

*Primary Examiner*—A. Lionel Clingman
*Attorney, Agent, or Firm*—Stevens, Davis, Miller & Mosher

[57] ABSTRACT

A reactive dye composition comprising at least one alkylnaphthalenesulfonic acid/formaldehyde condensate and a compound represented by the following formula,

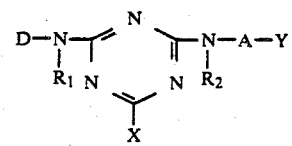

wherein D is an organic dye residue having at least one sulfo group, $R_1$ and $R_2$ are independently a hydrogen atom or a $C_1$ to $C_4$ alkyl group unsubstituted or substituted with a halogen atom or a hydroxy, cyano, alkoxy, carboxy, carbamoyl, alkoxycarbonyl, alkylcarbonyloxy, sulfo or sulfamoyl group, A is a phenylene group unsubstituted or substituted with one or two substituents selected from chlorine and bromine atoms and methyl, ethyl, methoxy, ethoxy and sulfo groups, or a naphthylene group unsubstituted or substituted with one sulfo group, X is a halogen atom, and Y is $-SO_2CH=CH_2$ or $-SO_2CH_2CH_2Z$ in which Z is a group capable of being split by an alkali, which composition is very readily soluble in water and aqueous alkaline solution, so that a dyeing or printing of cellulose fiber materials can be effectively carried out even by one-bath pad dyeing or one-phase printing methods to give a dyed product of a deep color having excellent levelness and no speck.

8 Claims, No Drawings

REACTIVE DYE COMPOSITION

The present invention relates to a reactive dye composition. More specifically, the invention relates to a reactive dye composition which is well soluble in water and an aqueous alkaline solution and useful for dyeing or printing cellulose fiber materials.

As well known, so-called one-bath pad dyeing methods, such as a one-bath pad-batch method, a one-bath pad-dry method and a one-bath pad steam method, and one-phase printing methods have been effectively applied for dyeing natural and regenerated cellulose fiber materials. However, in the preparation of a padding liquor and a printing paste usable for such one-bath pad dyeing and one-phase printing methods, respectively, the reactive dyes should be sufficiently soluble in an aqueous alkaline solution. For example, in the preparation of a padding liquor usable for the one-bath pad-batch method, about 100 parts by weight of a reactive dye should be soluble in 1000 parts by weight of an aqueous alkaline solution comprising an alkali such as sodium hydroxide, sodium carbonate or trisodium phosphate, and an electrolyte.

In an exhaustion dyeing method which is also effective for dyeing cellulose fiber materials, reactive dyes are required to be well soluble in an aqueous solution comprising a large amount of an electrolyte and an alkali.

While, reactive dyes having both fiber-reactive groups, monohalogenotriazinyl group and vinyl sulfone type group, are well known to have prominent dye performances for dyeing or printing cellulose fiber materials. Generally speaking, however, reactive dyes of this kind are well soluble in water but not in an aqueous alkaline solution, and therefore difficult to give a dyed product having a levelling and deep color without any speck.

The present inventors have undertaken extensive studies to find an improvement in the solubility of all of the reactive dyes having both fiber-reactive groups described aboved, and as a result found that the solubility can be improved by incorporating an alkylnaphthalenesulfonic acid/formaldehyde condensate with the reactive dyes.

Thus, the present invention provides a reactive dye composition comprising at least one alkylnaphthalenesulfonic acid/formaldehyde condensate and a compound represented by the following formula (I),

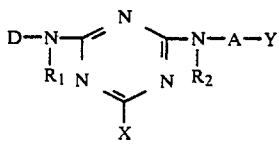

wherein D is an organic dye residue having at least one sulfo group, $R_1$ and $R_2$ are independently a hydrogen atom or a $C_1$ to $C_4$ alkyl group unsubstituted or substituted with a halogen atom or a hydroxy, cyano, alkoxy, carboxy, carbamoyl, alkoxycarbonyl, alkylcarbonyloxy, sulfo or sulfamoyl group, A is a phenylene group unsubstituted or substituted with one or two substituents selected from chlorine and bromine atoms and methyl, ethyl, methoxy, ethoxy and sulfo groups, or a naphthylene group unsubstituted or substituted with one sulfo group, X is a halogen atom, and Y is $-SO_2CH=CH_2$ or $-SO_2CH_2CH_2Z$ in which Z is a group capable of being split by an alkali, and a process for dyeing or printing cellulose fiber materials.

The dye composition in accordance with the present invention is extremely soluble in any kind of aqueous alkaline solution, and therefore can give a dyed product of a levelling and deep color without any speck even by the aforesaid one-bath pad dyeing methods. Moreover, the present dye composition can be formed into a thick and stable printing paste and thus give a printed product of a levelling and deep color without any speck even by the one-phase printing method.

The alkylnaphthalenesulfonic acid/formaldehyde condensate usable in the present invention can be prepared readily in a conventional manner.

The alkylnaphthalenesulfonic acid includes, for example, mono- or di-methylnaphthalenesulfonic acid, mono- or di-ethylnaphthalenesulfonic acid, mono- or di-propylnaphthalenesulfonic acid, mono- or di-butyl-naphthalenesulfonic acid and the like. In the preparation of the condensate, at least one member, preferably two or more of the alkylnaphthalenesulfonic acids listed above can be used in the form of an alkali metal salt.

A sulfonation degree of the alkylnaphthalenesulfonic acid is from 50 through 150%, preferably 80 through 120%. In the present invention, it is regarded as 100% of sulfonation degree, when 1 mol of sulfonic acid is bonded to 1 mol of an alkylnaphthalene.

An average condensation degree of the condensate is from 1.1 through 3.0, preferably from 1.5 through 2.5.

The compound of the formula (I) usable in the present invention can be prepared by (1) condensing a sulfo group-containing compound represented by the following formula (II),

wherein D and $R_1$ are as defined above, with a trihalogenotriazine represented by the following formula (III),

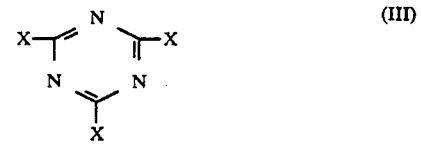

wherein X is as defined above, followed by condensation with an amine represented by the following formula (IV),

wherein $R_2$, A and Y are as defined above, or (2) condensing the amine of the formula (IV) with the trihalogenotriazine of the formula (III), followed by condensation with the sulfo group-containing compound of the formula (II).

The organic dye residue represented by D in the formula (I) includes residues of azo dyes including monoazo dyes, disazo dyes and the like, metal-containing mono- and dis-azo dyes, metal-containing formazans, metal-containing phthalocyanines, anthraquinones, stilbenes, oxazines, dioxazines, triphenylmethanes, phenazines, xanthenes, thioxanthenes, naphthoquinones, pyrenequinones, perylenetetracarboimides, nitro and azomethines, and the like. Examples of the metals contained in the metal-containing dyes are copper, chrominum, cobalt, nickel, iron and the like.

In the above formula (I), preferred $R_1$ and $R_2$ are each hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like.

Examples of preferred A are as follows.

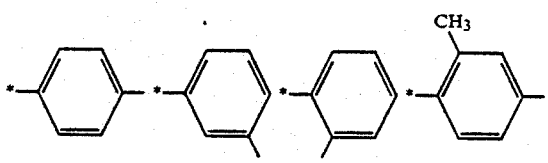

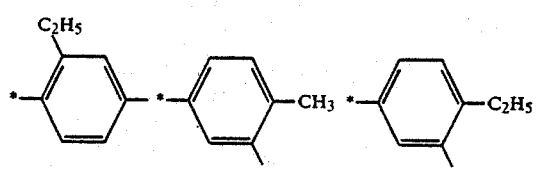

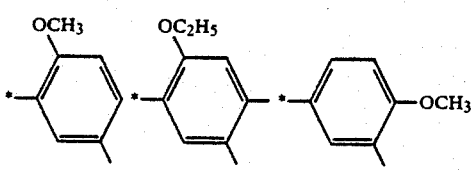

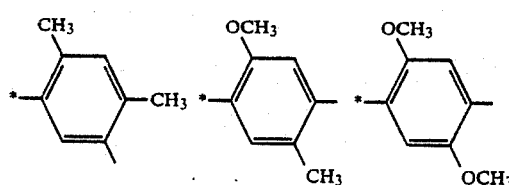

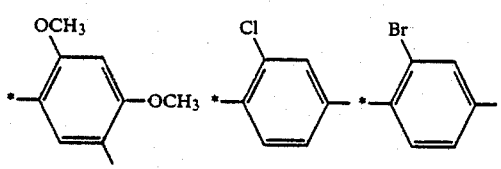

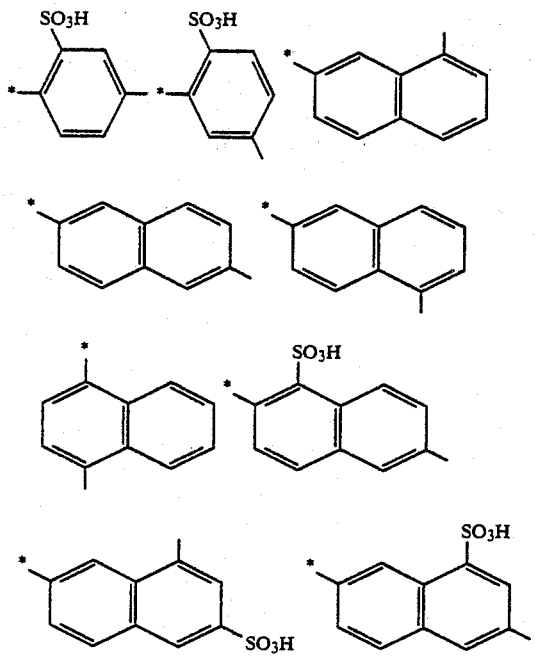

(In the above formulas, the asterisked linkage is bonded to the group,

)

The halogen represented by X includes chlorine, fluorine and the like, and the splittable group Z in the formula, $-SO_2CH_2CH_2Z$, includes, for example, sulfuric acid ester, thiosulfuric acid ester, phosphoric acid ester and acetic acid ester groups and halogen atoms.

The reactive dye composition of the present invention can be readily prepared by thoroughly mixing 20 to 90% by weight, preferably 60 to 80% by weight, of the compound represented by the formula (I), and 10 to 80% by weignt, preferably 20 to 40% by weight, of at least one member selected from the alkylnaphthalenesulfonic acid/formaldehyde condensates.

The dye compositions of the present invention may contain hydrotropic agents (e.g. urea, anthraquinone-2-sulfonic acid) and builders having little or no effect on the solubility of the dye compositions (e.g. dextrin, sucrose). Further, electrolytes (e.g. sodium chloride, sodium sulfate) in small amounts which exert no adverse effect on the solubility of the dye compositions, dust-preventing agents (e.g. mineral oil emulsions), pH stabilizers (e.g. disodium hydrogen phosphate) and water softeners (e.g. polyphosphates) may be added to the dye compositions of the present invention.

The dye composition thus prepared can be used effectively for dyeing or printing natural cellulose fiber materials such as cotton, linen, hemp, jute, ramie and the like, and regenerated materials such as viscose staple, filament viscose and the like in various dyeing or printing manners including one-bath pad dyeing and one-phase printing methods.

In carrying out the dyeing, the dye composition of the present invention is dissolved in water or mixed with a printing paste and then mixed with an alkali and, if desired, additives as described above, to prepare a dyeing medium having a predetermined dye concentration (for example, padding liquor or color paste). Alternatively, the dyeing medium can be prepared by mixing the compound of the formula (I) and the above-defined condensate together with an alkali, and if desired additives as described above, in an aqueous medium.

The dyeing can be effected, in general, at a temperature of 10° to 200° C. for 15 seconds to 48 hours in the presence of alkalis such as sodium hydroxide, sodium carbonate, sodium bicarbonate, trisodium phosphate and the like.

More concretely speaking, the one-bath pad dyeing and one-phase printing methods can be carried out at about 100° C. for 5 to 10 minutes (steaming method), at 105° to 180° C. for 15 seconds to 15 minutes preferably 1 to 10 minutes (high temperature steaming method), or at 120° to 200° C. for 30 seconds to 10 minutes (thermofixing method). Alternatively, the dyeing can be also effected at 50° to 80° C. for about 60 minutes by an exhaustion dyeing method, or at 10° to 30° C. for 15 to 48 hours by a cold pad batching method.

In accordance with the present invention, the dyeing or printing of cellulose fiber materials can be effectively carried out by any dyeing method to give dyed or printed products of a deep color having excellent levelness and no specks.

The present invention is explained in more detail with reference to the following Examples, which are only illustrative and are not intended to limit the scope of the present invention. In the Examples, parts are by weight.

EXAMPLE 1

Sixty five parts of a compound of the following formula:

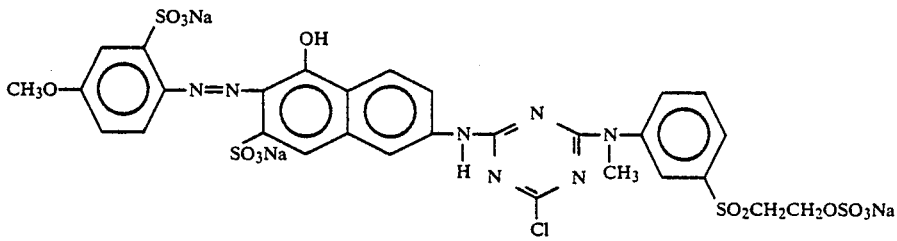

was thoroughly mixed with 10 parts of diethylnaphthalenesulfonic acid/formaldehyde condensate (sodium salt, sulfonation degree 100%, average condensation degree 2.5), 24 parts of monoethylnaphthalenesulfonic acid/formaldehyde condensate (sodium salt, having the same sulfonation and average condensation degrees as above), and 1 part of mineral oil emulsion to prepare a dye composition.

(a) One hundred grams of the dye composition thus obtained was dissolved into hot water and cooled to 25° C. After adding 15 ml of 32.5% aqueous solution of sodium hydroxide and 150 g of water-glass (50Bé) to the solution, the resulting mixture was diluted with water to make the volume one liter at 25° C. Immediately, the solution thus obtained was used as a padding liquor to pad a cotton fabric. The padded cotton fabric was batched up, tightly sealed with a polyethylene film and allowed to stand at 20° C. for 20 hours in a room. The dyed fabric was rinsed with cold water and then with hot water, soaped with a boiling detergent solution, again rinsed with cold water and dried. Thus, there was obtained a very deep scarlet product having no speck.

(b) When the padding liquor of (a) was allowed to stand at 25° C. for 120 minutes, no deposition of dye was observed at all. Thereafter, cotton fabric was dyed in the same manner as in (a). Thus, a dyed product of a levelling and deep color having no speck was obtained.

EXAMPLE 2

Sixty five parts of a compound of the following formula,

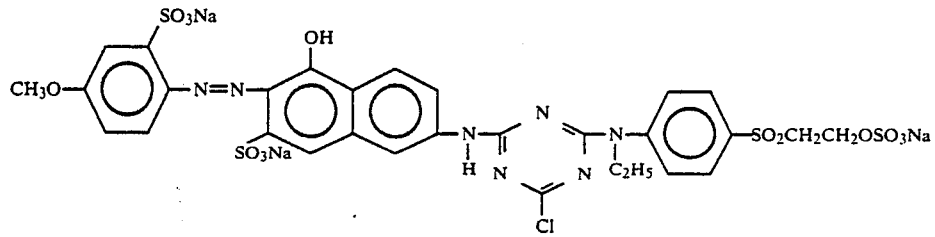

was thoroughly mixed with 20 parts of dimethylnaphthalenesulfonic acid/formaldehyde condensate (sodium salt, sulfonation degree 110%, average condensation degree 1.8), 19 parts of monomethylnaphthalenesulfonic acid/formaldehyde condensate (sodium salt, having the same sulfonation and average condensation degrees as above) and 1 part of mineral oil emulsion to prepare a dye composition.

Using the dye composition obtained, the procedures (a) and (b) of Example 1 were repeated to obtain each dyed product of a deep scarlet color having excellent levelness and no speck.

EXAMPLE 3

Seventy five parts of a compound of the following formula,

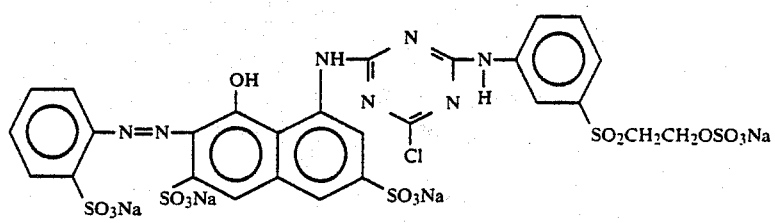

was thoroughly mixed with 6.5 parts of dimethylnaphthalenesulfonic acid/formaldehyde condensate (sodium salt, sulfonation degree 110%, average condensation degree 1.8), 17.5 parts of naphthalenesulfonic acid/formaldehyde condensate (sodium salt) and 1 part of mineral oil emulsion to obtain a dye composition.

Each manner similar to that of (a) and (b) in Example 1 was repeated, provided that 70 g of the dye composition obtained above was used in (a), and the padding liquor obtained in (a) was allowed to stand for 60 minutes at 25° C., whereby there was obtained each dyed product of a deep red color having excellent levellness and no speck.

EXAMPLE 4

Sixty five parts of a compound of the following formula,

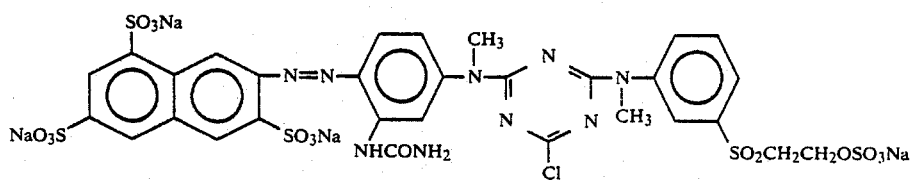

was thoroughly mixed with 34 parts of methylnaphthalenesulfonic acid/formaldehyde condensate (sodium salt, sulfonation degree 110%, average condensation degree 1.5) and 1 part of mineral oil emulsion to obtain a dye composition.

Using the dye composition obtained, the procedures (a) and (b) of Example 1 were repeated to obtain each dyed product of a deep yellow color having excellent levellness and no speck.

EXAMPLE 5

Seventy parts of a compound of the following formula

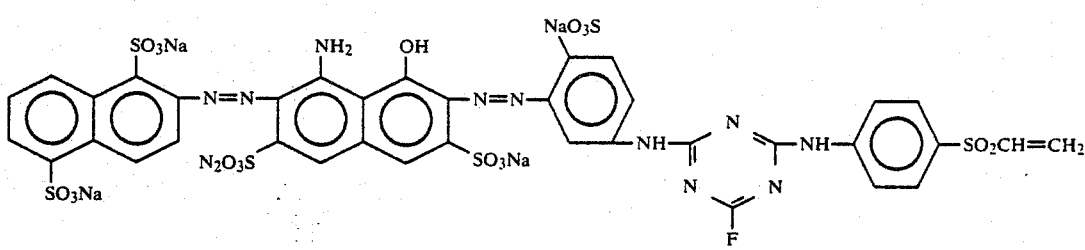

was thoroughly mixed with 29 parts of diethylnaphthalenesulfonic acid/formaldehyde condensate (sodium salt, sulfonation degree 100%, average condensation degree 1.8) and 1 part of mineral oil emulsion to obtain a dye composition.

Using the dye composition obtained, the procedures (a) and (b) of Example 1 were repeated, provided that the padding liquor in (a) was allowed to stand for 60 minutes at 25° C., whereby there was obtained each dyed product of a deep navy blue having excellent levellness and no speck.

EXAMPLE 6

Sixty parts of a compound of the following formula,

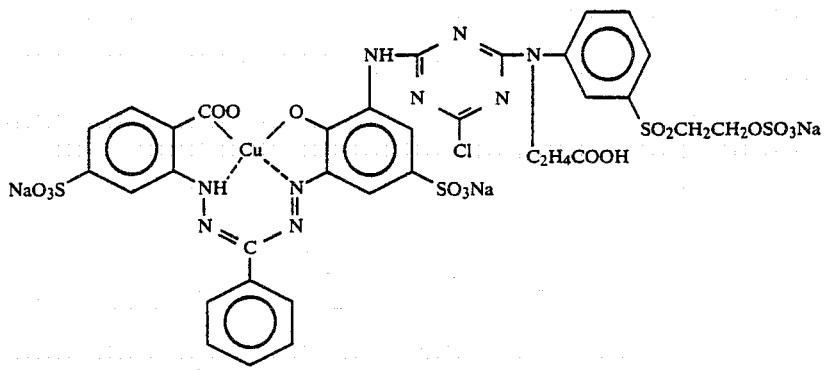

was thoroughly mixed with 20 parts of dimethylnaphthalenesulfonic acid/formaldehyde condensate (sodium salt, sulfonation degree 110%, average condensation degree 1.8), 19 parts of monomethylnaphthalenesulfonic acid/formaldehyde condensate (sodium salt, having the same sulfonation and average condensation degrees as above) and 1 part of mineral oil emulsion to obtain a dye composition.

Using the dye composition obtained, the procedures (a) and (b) of Example 1 were repeated to obtain each dyed product of a deep blue color having excellent levellness and no speck.

EXAMPLE 7

Fifty five parts of a compound of the following formula,

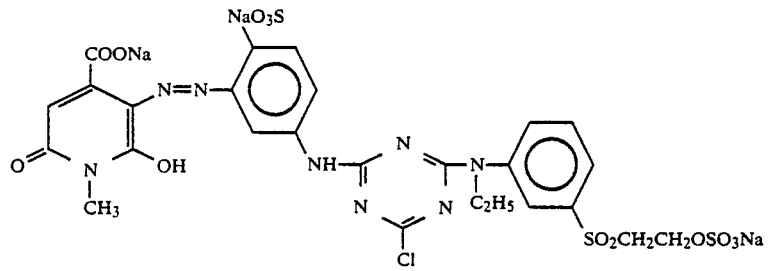

was thoroughly mixed with 15 parts of diethylnaphthalenesulfonic acid/formaldehyde condensate (sodium salt, sulfonation degree 120%, average condensation degree 1.8), 29 parts of monoethylnaphthalenesulfonic acid (sodium salt, having the same sulfonation and average condensation degrees as above) and 1 part of mineral oil emulsion to obtain a dye composition.

Using 80 g of the dye composition obtained, the procedures (a) and (b) of Example 1 were repeated to obtain each dyed product of a deep greenish yellow color having excellent levellness and no speck.

EXAMPLE 8

Seventy parts of a compound of the following formula,

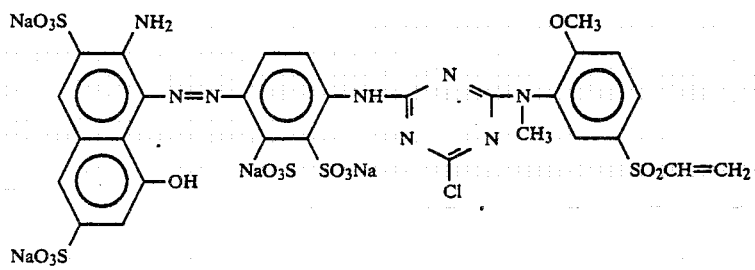

was thoroughly mixed with 15 parts of dimethylnaphthalenesulfonic acid/formaldehyde condensate (sodium salt, sulfonation degree 120%, average condensation degree 1.8), 14 parts of diethylnaphthalenesulfonic acid (sodium salt, having the same sulfonation and average condensation degrees as above) and 1 part of mineral oil emulsion to obtain a dye composition.

Using the dye composition obtained, the procedures (a) and (b) of Example 1 were repeated to obtain each dyed product of a deep red color having excellent levellness and no speck.

EXAMPLE 9

Sixty five parts of a compound of the following formula,

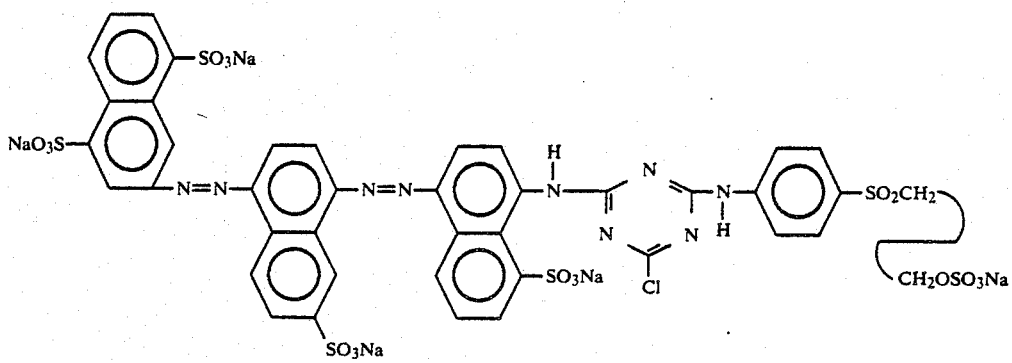

was thoroughly mixed with 20 parts of methylnaphthalenesulfonic acid/formaldehyde condensate (sodium salt, sulfonation degree 110%, average condensation degree 1.8) 14 parts of ethylnaphthalenesulfonic acid/formaldehyde condensate (sodium salt, having the same sulfonation and average condensation degrees as above) and 1 part of mineral oil emulsion to obtain a dye composition.

Using the dye composition obtained, the procedures (a) and (b) of Example 1 were repeated to obtain each dyed product of a deep brown color having excellent levellness and no speck.

EXAMPLE 10

Sixty parts of a compound of the following formula,

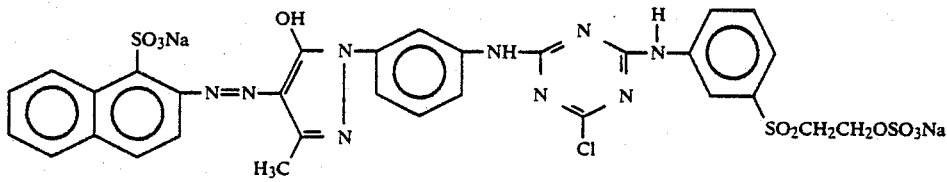

was thoroughly mixed with 15 parts of dimethylnaphthalenesulfonic acid/formaldehyde condensate (sodium salt, sulfonation degree 100%, average condensation degree 1.8), 24 parts of monomethylnaphthalenesulfonic acid/formaldehyde condensate (sodium salt, having the same sulfonation and average condensation degrees as above) and 1 part of mineral oil emulsion to obtain a dye composition.

Using the dye composition obtained, the procedures (a) and (b) of Example 1 were repeated to obtain each dyed product of a deep yellow color having excellent levellness and no speck.

EXAMPLE 11

Sixty parts of a compound of the following formula,

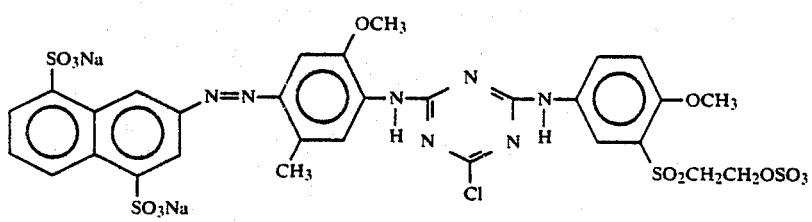

was thoroughly mixed with 30 parts of dimethylnaphthalenesulfonic acid/formaldehyde condensate (sodium salt, sulfonation degree 110%, average condensation degree 1.8), 9 parts of monomethylnaphthalenesulfonic acid/formaldehyde condensate (sodium salt, having the same sulfonation and average condensation degrees as above) and 1 part of mineral oil emulsion to obtain a dye composition.

Using the dye composition obtained, the procedures (a) and (b) of Example 1 were repeated to obtain each dyed product of a deep yellow color having excellent levellness and no speck.

EXAMPLE 12

Sixty five parts of a compound of the following formula,

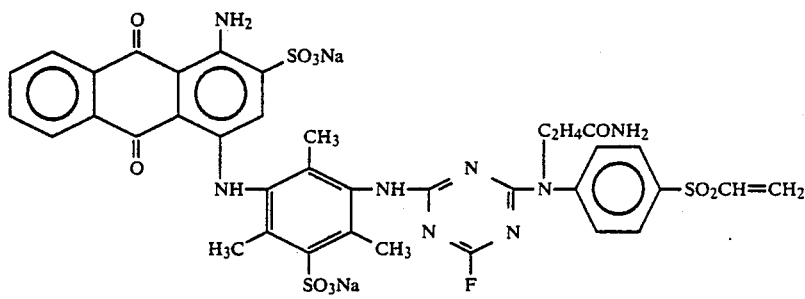

was thoroughly mixed with 20 parts of dimethylnaphthalenesulfonic acid/formaldehyde condensate (sodium salt, sulfonation degree 120%, average condensation degree 1.8), 14 parts of diethylnaphthalenesulfonic acid/formaldehyde condensate (sodium salt, having the same sulfonation and average condensation degrees as

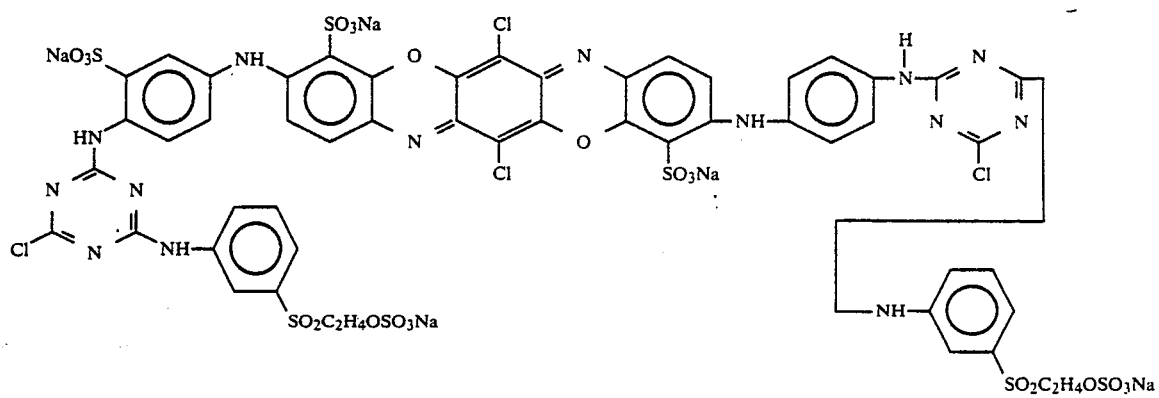

above) and 1 part of mineral oil emulsion to obtain a dye composition.

Using the dye composition obtained, the procedures (a) and (b) of Example 1 were repeated to obtain each dyed product of a deep blue color having excellent levellness and no speck.

EXAMPLE 13

Seventy parts of a compound of the following formula,

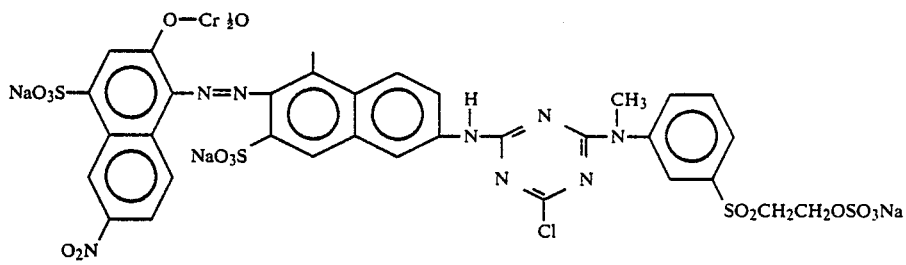

was thoroughly mixed with 29 parts of diethylnaphthalenesulfonic acid/formaldehyde condensate (sodium salt, sulfonate degree 100%, average condensation degree 2.0) and 1 part of mineral oil emulsion to obtain a dye composition.

Using 120 g of the dye composition obtained, the procedures (a) and (b) of Example 1 were repeated, provided that the padding liquor in (a) was allowed to stand for 60 minutes at 25° C., whereby there was ob- tained each dyed product of a deep black color having excellent levellness and no speck.

EXAMPLE 14

Sixty parts of a compound of the following formula, was thoroughly mixed with 15 parts of dimethylnaphthalenesulfonic acid/formaldehyde condensate (sodium salt, sulfonation degree 110%, average condensation degree 1.8), 24 parts of monomethylnaphthalenesulfonic acid/formaldehyde condensate (sodium salt, having the same sulfonation and average condensation degrees as above) and 1 part of mineral oil emulsion to obtain a dye composition.

Using the dye composition obtained, the procedures (a) and (b) of Example 1 were repeated, provided that the padding liquor in (a) was allowed to stand for 60 minutes at 25° C., whereby there was obtained each dyed product of a deep blue color having excellent levellness and no speck.

EXAMPLE 15

Sixty parts of a compound of the following formula,

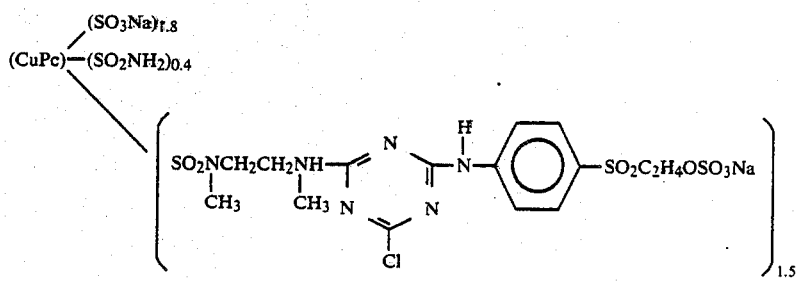

was thoroughly mixed with 30 parts of dimethylnaphthalenesulfonic acid/formaldehyde condensate (sodium salt, sulfonation degree 110%, average condensation degree 1.8), 9 parts of monomethylnaphthalenesulfonic acid/formaldehyde condensate (sodium salt, having the same sulfonation and average condensation degrees) and 1 g of mineral oil emulsion to obtain a dye composition.

Using 80 g of the dye composition obtained, the procedures (a) and (b) of Example 1 were repeated, provided that the padding liquor in (a) was allowed to stand for 60 minutes at 25° C, whereby there was obtained each dyed product of a deep greenish blue color having excellent levelness and no speck.

EXAMPLE 16

Seventy parts of a compound of the following formula,

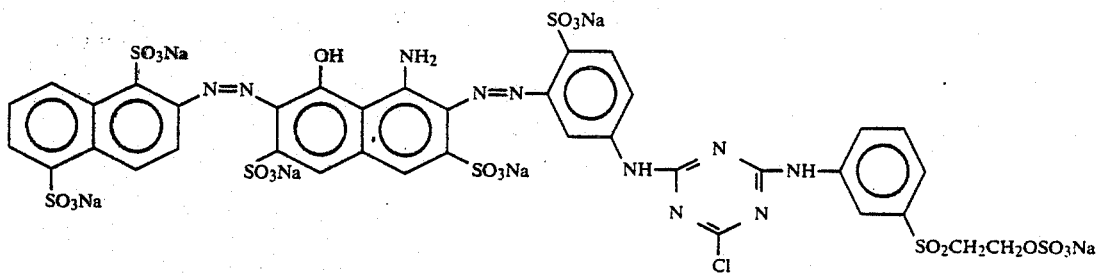

was thoroughly mixed with 29 parts of monomethylnaphthalenesulfonic acid/formaldehyde condensate (sodium salt, sulfonation degree 100%, average condensation degree 2.5) and 1 part of mineral oil emulsion to obtain a dye composition.

(a) One hundred grams of the dye composition thus obtained was dissolved in 700 ml of hot water and to this solution were added 20 g of sodium m-nitrobenzenesulfonate, 1 g of sodium alginate, 20 g of sodium hydrogencarbonate and water to make one liter of a padding liquor. Immediately thereafter, a cotton fabric was padded with the liquor and then dried with hot air of 130° C. The dried fabric was steamed at 150° C. for 1 minute, rinsed with cool water and then hot water, soaped with a boiling detergent solution, again rinsed with cool water and then dried. Thus, there was obtained a dyed product of a extremely deep navy blue color having no speck.

(b) The padding liquor of (a) was allowed to stand at 25° C. for 120 minutes, but no deposition of the dye was observed at all. Then, cotton fabric was dyed using the liquor in the same manner as in (a), thereby obtaining a dyed product of a levelling and deep color having no speck.

EXAMPLE 17

Seventy parts of the same compound as in Example 16 was thoroughly mixed with 29 parts of dimethylnaphthalenesulfonic acid/formaldehyde condensate (sodium salt, sulfonation degree 100%, average condensation degree 1.8) and 1 part of mineral oil emulsion to obtain a dye composition.

(a) Fifty parts of the dye composition thus obtained was dissolved in 300 g of hot water. To this solution were added 50 g of urea, 580 g of a thickener, 20 g of sodium hydrogencarbonate and water to prepare 1 Kg of a printing paste. Immediately thereafter, cotton fabric was printed with this printing paste and dried. The dried fabric was steamed at 103° C. for 5 minutes, then rinsed with cool water and then hot water, soaped with a boiling detergent solution, again rinsed with cool water, and dried. Thus, there was obtained a printed product of a extremely deep navy blue color having no speck.

(b) The printing paste of (a) was allowed to stand at 25° C. for a week, but no change was observed. Thereafter, cotton fabric was printed using the paste, thereby obtaining a printed product of a levelling and deep color having no speck.

COMPARATIVE EXAMPLE 1

Sixty five parts of the same compound as in Example 1 was thoroughly mixed with 34 parts of naphthalenesulfonic acid/formaldehyde condensate (sodium salt, sulfonation degree 100%, average condensation degree 5.0) and 1 part of mineral oil emulsion to obtain a dye composition.

(a) One hundred grams of the dye composition obtained was dissolved in hot water and cooled to 21° C. The resulting solution was formed into a padding liquor in the same manner as in Example 1. Immediately after preparation of the liquor, no deposition of the compound was observed, and the padding liquor was used for dyeing cotton fabric to obtain a dyed product having no speck but pale color.

(b) The padding liquor prepared above was allowed to stand for 30 minutes at 25° C., whereby there was observed a great deposition of the compound. Pad dyeing of cotton fabric was carried out with use of that liquor, thereby obtaining a dyed product having many specks, which was of no practical value.

COMPARATIVE EXAMPLE 2

Sixty five parts of the same compound as in Example 2 was thoroughly mixed with 34 parts of anhydrous sodium sulfate and 1 part of mineral oil emulsion to obtain a dye composition.

(a) One hundred grams of the dye composition obtained was dissolved in hot water and then cooled to 25° C. In the same manner as in Example 2, the resulting solution was subjected to preparation of a padding liquor during which there was observed a great deposition of the compound. Pad dyeing of cotton fabric was carried out with use of the resulting liquor, thereby obtaining a dyed product having many specks, which was of no practical value.

COMPARATIVE EXAMPLE 3

Seventy five parts of the same compound as in Example 3 was thoroughly mixed with 7 parts of sodium anthraquinone-2-sulfonate, 15 parts of naphthalenesulfonic acid/formaldehyde condensate (sodium salt, sulfonation degree 100%, average condensation degree 5.0) and 1 part of mineral oil emulsion to obtain a dye composition.

(a) Seventy grams of the dye composition obtained was dissolved in hot water and then cooled to 25° C. The solution obtained was formed into a padding liquor in the same manner as in Example 3. There was observed no deposition of the compound. Successively, pad dyeing of cotton fabric was carried out with use of the solution, thereby obtaining a dyed product of a pale color.

(b) The padding liquor obtained above was allowed to stand for 20 minutes at 25° C. Then, there was observed a great deposition of the compound. Successively, pad dyeing of cotton fabric was carried out with use of that liquor, thereby obtaining a dyed product having many specks, which was of no practical value.

COMPARATIVE EXAMPLE 4

Sixty five parts of the same compound as in Example 4 was thoroughly mixed with 34 parts of naphthalenesulfonic acid/formaldehyde condensate (sodium salt, sulfonation degree 180%, average condensation degree 1.1) and 1 part of mineral oil emulsion to obtain a dye composition.

(a) One hundred parts of the dye composition obtained was dissolved in hot water and then cooled to 25° C. The resulting solution was formed into a padding liquor in the same manner as in Example 4. Using the liquor obtained, pad dyeing of cotton fabric was carried out to obtain a dyed product of a deep color like in Example 4.

(b) The padding liquor obtained above was allowed to stand for 10 minutes at 25° C. Then there was observed a great deposition of the compound. Using this liquor, pad dyeing of cotton fabric was carried out, thereby obtaining a dyed product having many specks, which was of no practical value.

COMPARATIVE EXAMPLE 5

Ninety eight parts of the same compound as in Example 5 was thoroughly mixed with 2 parts of mineral oil emulsion to obtain a dye composition.

(a) Using 65 g of the dye composition obtained a padding liquor was prepared in the same manner as in Example 5. There was observed no deposition of the compound immediately after preparation of the liquor, but the liquor became viscouse. Using this viscous liquor, pad dyeing of cotton fabric was carried out, thereby obtaining a dyed product of a pale color.

(b) The padding liquor obtained above was allowed to stand for 30 minutes at 25° C. Then, gelation occurred to make the pad dyeing impossible.

What is claimed is:

1. A reactive dye composition comprising at least one alkylnaphthalenesulfonic acid/formaldehyde condensate and a compound represented by the following formula,

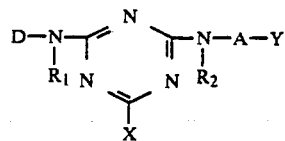

wherein D is an organic dye residue having at least one sulfo group, $R_1$ and $R_2$ are independently a hydrogen atom or a $C_1$ to $C_4$ alkyl group unsubstituted or substituted with a halogen atom or a hydroxy, cyano, alkoxy, carboxy, carbamoyl, alkoxycarbonyl, alkylcarbonyloxy, sulfo or sulfamoyl group, A is a phenylene group unsubstituted or substituted with one or two substituents selected from chlorine and bromine atoms and methyl, ethyl, methoxy, ethoxy and sulfo groups, or a naphthylene group unsubstituted or substituted with one sulfo group, X is a halogen atom, and Y is $-SO_2CH=CH_2$ or $-SO_2CH_2CH_2Z$ in which Z is group capable of being split by an alkali.

2. The composition according to claim 1, wherein the alkylnaphthalenesulfonic acid is at least one member selected from mono- and di-methylnaphthalenesulfonic acids, mono- and di-ethylnaphthalenesulfonic acids, mono- and di-propylnaphthalenesulfonic acids and mono- and di-butylnaphthalenesulfonic acids.

3. The composition according to claim 1, wherein a sulfonation degree and an average condensation degree of the condensate are from 50 through 150%, and from 1.1 through 3.0, respectively.

4. The composition according to claim 1, wherein each amount of the condensate and the compound is 10 to 80% by weight and 90 to 20% by weight, respectively.

5. The composition according to claim 1, wherein the composition further comprises at least one member selected from hydrotropic agents, builders, electrolytes, dust-preventing agents, pH stabilizers and water softeners.

6. A process for producing a reactive dye composition, which comprises admixing at least one alkylnaphthalenesulfonic acid/formaldehyde condensate and a compound represented by the following formula,

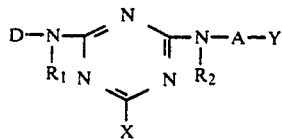

wherein D is an organic dye residue having at least one sulfo group, $R_1$ and $R_2$ are independently a hydrogen atom or a $C_1$ to $C_4$ alkyl group unsubstituted or substituted with a halogen atom or a hydroxy, cyano, alkoxy, carboxy, carbamoyl, alkoxycarbonyl, alkylcarbonyloxy, sulfo or sulfamoyl group, A is a phenylene group unsubstituted or substituted with one or two substituents selected from chlorine and bromine atoms and methyl, ethyl, methoxy, ethoxy and sulfo groups, or a naphthylene group unsubstituted or substituted with one sulfo group, X is a halogen atom, and Y is —$SO_2CH\!=\!CH_2$ or —$SO_2CH_2Z$ in which Z is a group capable of being split by an alkali.

7. A process for dyeing or printing cellulose fiber materials, which comprises carrying out the dyeing or printing at a temperature of 10° to 200° C. for 15 seconds to 48 hours in the presence of an alkali using a reactive dye composition comprising at least one alkylnaphthalenesulfonic acid/formaldehyde condensate and a compound represented by the following formula,

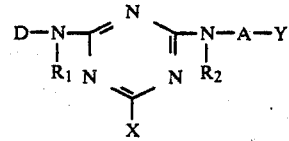

wherein D is an organic dye residue having at least one sulfo group, $R_1$ and $R_2$ are independently a hydrogen atom or a $C_1$ to $C_4$ alkyl group unsubstituted or substituted with a halogen atom or a hydroxy, cyano, alkoxy, carboxy, carbamoyl, alkoxycarbonyl, alkylcarbonyloxy, sulfo or sulfamoyl group, A is a phenylene group unsubstituted or substituted with one or two substituents selected from chlorine and bromine atoms and methyl, ethyl, methoxy, ethoxy and sulfo groups, or a naphthylene group unsubstituted or substituted with one sulfo group, X is a halogen atom, and Y is —$SO_2CH\!=\!CH_2$ or —$SO_2CH_2CH_2Z$ in which Z is a group capable of being split by an alkali.

8. Products dyed by the process of claim 7.

* * * * *